US009014873B2

(12) United States Patent
Braunstein et al.

(10) Patent No.: US 9,014,873 B2
(45) Date of Patent: Apr. 21, 2015

(54) WORKSITE DATA MANAGEMENT SYSTEM

(71) Applicant: Caterpillar Inc., Peoria, IL (US)

(72) Inventors: Michael D. Braunstein, Washington, IL (US); Aaron M. Donnelli, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 203 days.

(21) Appl. No.: 13/752,331

(22) Filed: Jan. 28, 2013

(65) Prior Publication Data

US 2014/0214238 A1 Jul. 31, 2014

(51) Int. Cl.

*G05D 3/00* (2006.01)
*G06F 17/00* (2006.01)
*G07C 5/00* (2006.01)
*G07C 5/08* (2006.01)

(52) U.S. Cl.

CPC .............. *G07C 5/008* (2013.01); *G07C 5/0808* (2013.01)

(58) Field of Classification Search

CPC .. G07C 5/008; F02N 11/0807; G05D 1/0246; G06N 3/008
USPC ................ 701/2, 23, 24, 28, 30.5, 30.9, 31.1, 701/31.3; 700/245, 248, 249, 258, 259
See application file for complete search history.

(56) References Cited

U.S. PATENT DOCUMENTS

| | | | | |
|---|---|---|---|---|
| 6,321,147 | B1 | 11/2001 | Takeda et al. | |
| 7,254,482 | B2 | 8/2007 | Kawasaki et al. | |
| 7,496,475 | B2 * | 2/2009 | Byrne et al. | 702/184 |
| 7,761,544 | B2 | 7/2010 | Manasseh et al. | |
| 7,928,393 | B2 * | 4/2011 | Brady et al. | 250/341.5 |
| 8,139,820 | B2 | 3/2012 | Plante et al. | |
| 2007/0135979 | A1 | 6/2007 | Plante | |
| 2011/0295423 | A1 * | 12/2011 | Anderson | 700/248 |
| 2012/0085458 | A1 * | 4/2012 | Wenzel | 141/10 |
| 2012/0136507 | A1 * | 5/2012 | Everett et al. | 701/2 |
| 2014/0136020 | A1 * | 5/2014 | Halder et al. | 701/2 |

* cited by examiner

*Primary Examiner* — Mary Cheung
(74) *Attorney, Agent, or Firm* — Finnegan, Henderson, Farabow, Garrett & Dunner, LLP

(57) ABSTRACT

A data management system is disclosed for use with a plurality of machines operating at a worksite. The data management system may have a plurality of onboard sensory devices, each configured to generate data regarding at least one of machine performance and worksite conditions. The data management system may also have a plurality of onboard locating devices, each configured to generate a machine location signal. The data management system may further have a plurality of onboard communication devices, and a worksite controller. The worksite controller may be configured to receive the data and the machine location signals from onboard the plurality of machines via the plurality of communication devices, trigger an event based on the data received from onboard at least a first of the plurality of machines, and selectively retrieve data from at least a second of the plurality of machines based on event triggering.

40 Claims, 3 Drawing Sheets

WORKSITE DATA MANAGEMENT SYSTEM

TECHNICAL FIELD

The present disclosure is directed to a worksite system and, more particularly, a system for managing data from machines operating at a worksite.

BACKGROUND

Mobile machines such as haul trucks, excavators, motor graders, backhoes, water trucks, and other large equipment are utilized at a common worksite to accomplish a variety of tasks. In some situations, the machines are autonomously or semi-autonomously controlled. In these situations, control of the machines may be at least partially dependent on data provided by different sensors mounted onboard the machines. Specifically, data from the sensors can be selectively used to trigger different events associated with machine and/or worksite conditions.

The different events may be triggered to help ensure proper and productive operation of the machines at the worksite. For example, an event may be associated with an unexpected value for a monitored machine performance parameter, such as a sudden change in acceleration, heading, speed, wheel slip, torque output, or payload. In another example, an event may be associated with a detected obstacle in an intended travel path or a degraded road condition. When an event is triggered, a response may be initiated to deal with the event. The response could involve evasive machine maneuvering (e.g., slowing, stopping, steering, alternate path generation, etc.) and/or worksite maintenance (e.g., removal of an obstacle, roadway repair, path closure, etc.). In some situations, however, the data surrounding the triggered event may be insufficient, and generating a response in such situations could be ineffective, expensive, and even detrimental.

One attempt to improve data management of a mobile machine is described in U.S. Patent Publication 2007/0125979 by Plante that published on Jun. 14, 2007 ("the '979 publication"). In particular, the '979 publication describes a vehicle event recorder system having a video camera, a memory system, and a radio communications facility. An automobile is equipped with the video camera and the video camera continuously records video of the automobile and its surroundings. The system is then selectively triggered to provide a video record of unusual events that occur from time-to-time. These events include accidents, near-miss incidents, driving use, etc. When the events occur, the system is triggered to preserve video images collected before and after the moment of the event, and to wirelessly communicate the preserved images to an offboard location via the radio communications facility. Replay of these images at the offboard location can then yield information regarding the cause and true nature of the event. A plurality of similarly equipped vehicles may communicate with a common system at the offboard location, providing a fleet manager advanced fleet management tools.

Although the system of the '979 publication may help manage data associated with individual machines of a fleet during separate events, it may be less that optimal. In particular, the video record preserved by the system of the '979 patent may lack coordination of sufficient fleet data regarding a particular event. In addition, the system of the '979 patent may not provide a way to obtain or coordinate additional information about the event.

The disclosed worksite data management system is directed to overcoming one or more of the problems set forth above and/or other problems of the prior art.

SUMMARY

One aspect of the present disclosure is directed to a data management system for use with a plurality of machines operating at a common worksite. The data management system may include a plurality of sensory devices, each located onboard a different one of the plurality of machines and configured to generate data regarding at least one of machine performance and worksite conditions. The data management system may also include a plurality of locating devices, each located onboard a different one of the plurality of machines and configured to generate a machine location signal. The data management system may further include a plurality of communication devices, each located onboard a different one of the plurality of machines, and a worksite controller. The worksite controller may be configured to receive the data and the machine location signals from onboard the plurality of machines via the plurality of communication devices, trigger an event based on the data received from onboard at least a first of the plurality of machines, and selectively retrieve data from at least a second of the plurality of machines based on event triggering.

Another aspect of the present disclosure is directed to a method of worksite data management. The method may include capturing data from onboard a plurality of machines regarding at least one of machine performance and worksite conditions, and determining a location of each of the plurality of machines. The method may also include selectively triggering an event based on the data captured from onboard at least a first of the plurality of machines, and selectively retrieving data from at least a second of the plurality of machines based on event triggering.

DETAILED DESCRIPTION

Figure 1:
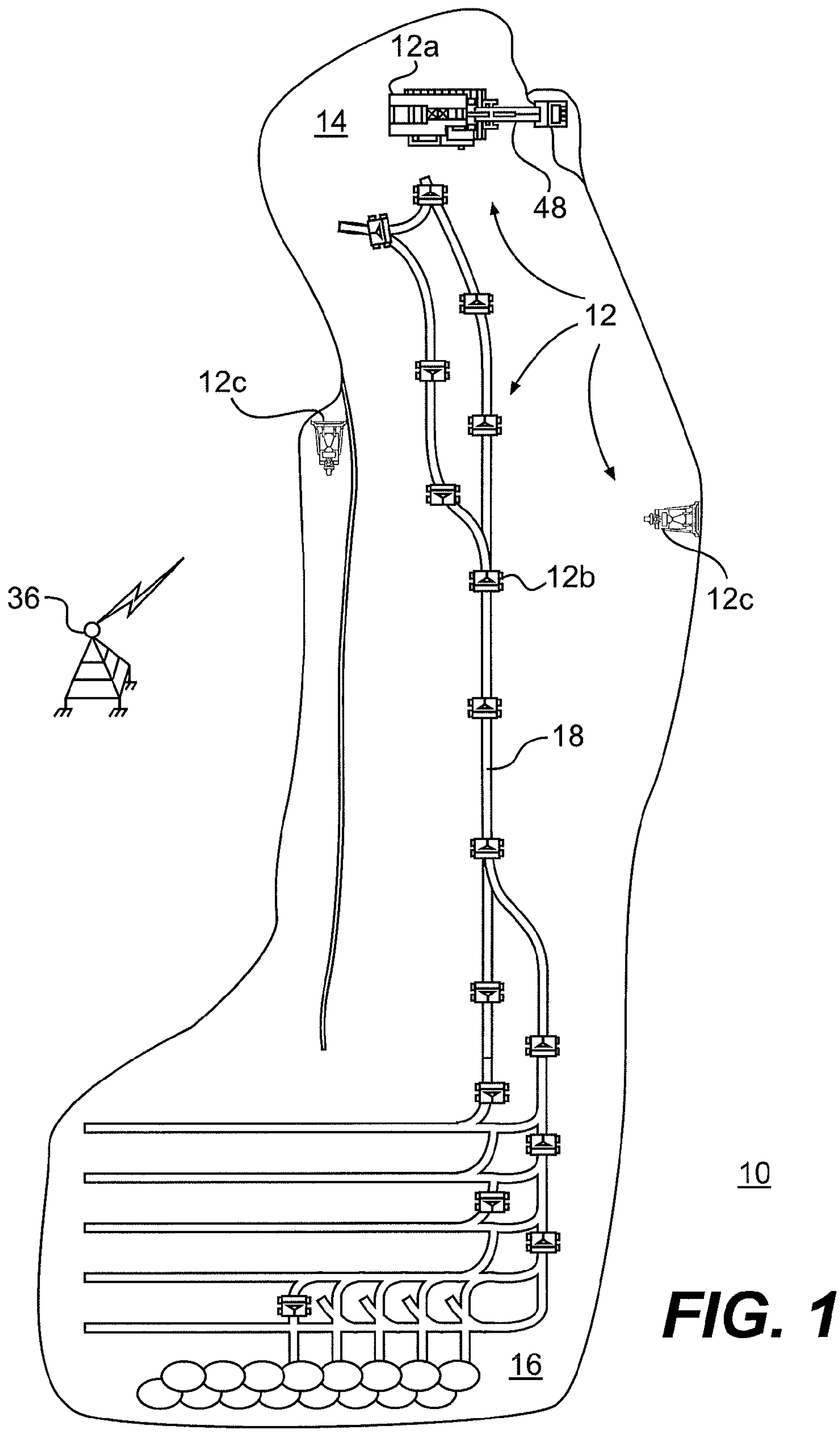
FIG. 1 is a diagrammatic illustration of an exemplary disclosed worksite.

FIG. 1 illustrates an exemplary worksite 10 with a plurality of machines 12 performing different tasks at worksite 10. Worksite 10 may include, for example, a mine site, a landfill, a quarry, a construction site, a road worksite, or any other type of worksite. The tasks may be associated with any work activity appropriate at worksite 10, and may require machines 12 to generally traverse worksite 10. Any number and type of machines 12 may simultaneously and cooperatively operate at worksite 10.

Worksite 10 may include multiple locations designated for particular purposes. For example, a first location 14 may be designated as a load location, at which a mobile loading machine **12*a* or other resource operates to fill multiple mobile haul machines 12*b* with material. A second location 16 may be designated as a dump location, at which haul machines 12*b*** discard their payloads. Haul machines 12*b* may follow a travel path 18 that generally extends between load and dump locations 14, 16.

One or more additional mobile dozing, grading, or other cleanup machines 12*c* at worksite 10 may be tasked with clearing or leveling load location 14, dump location 16, and/or travel path 18 such that travel by other machines 12 at these locations may be possible. As machines 12 operate at worksite 10, the shapes, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator. In the disclosed embodiment, at least some of machines 12 at worksite 10 are autonomously controlled.

Figure 2:
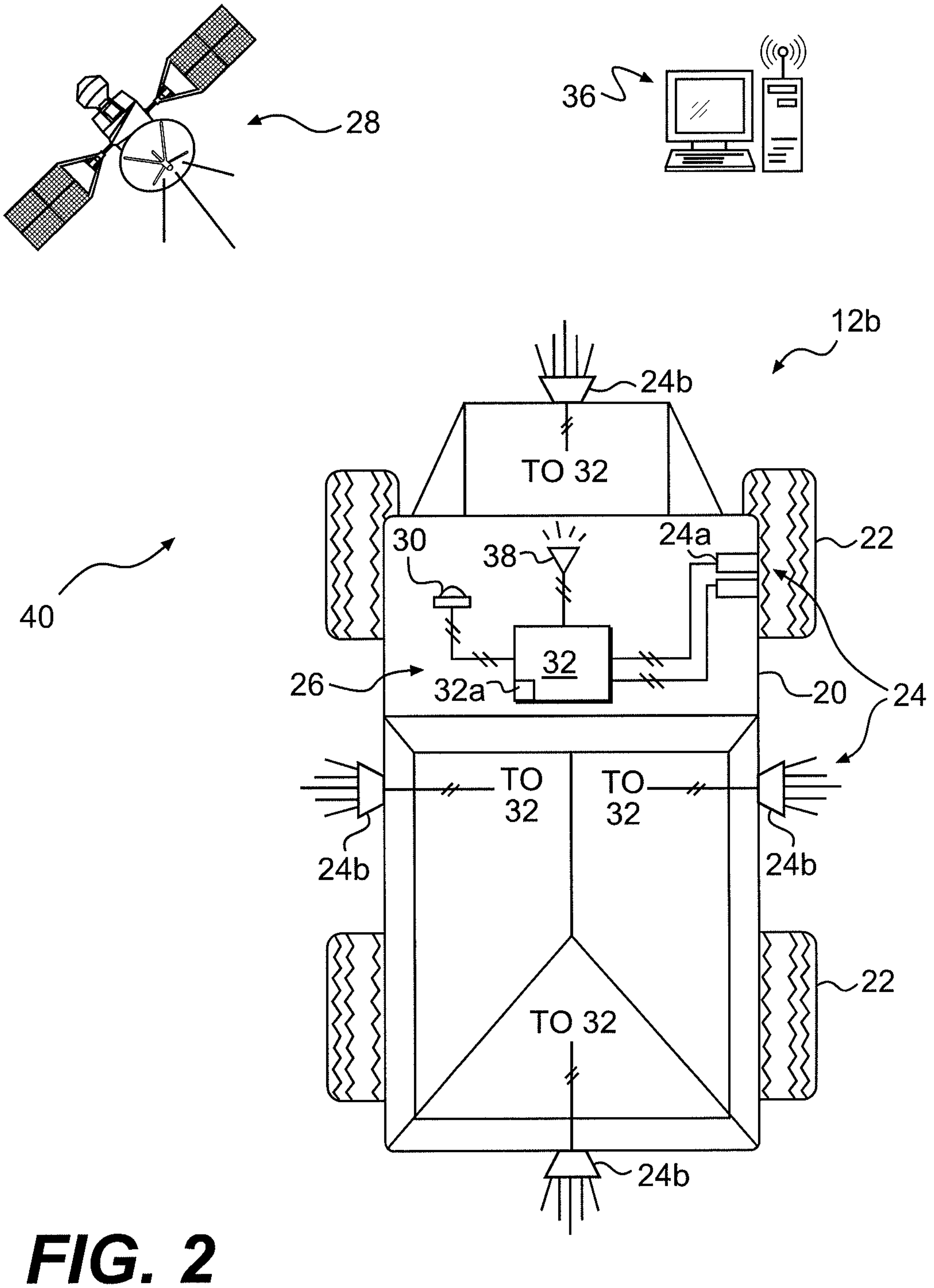
FIG. 2 is a diagrammatic illustration of an exemplary disclosed management system that may be used to manage the worksite of FIG. 1.

As shown in FIG. 2, each machine 12 (haul machine 12*b* shown by way of example only) may include, among other things, a body 20 supported by one or more traction devices 22, and a plurality of sensory devices 24 mounted to body 20. Sensory devices 24 may be used to capture data associated with machine performance and/or the environment at worksite 10. As machine 12 travels about worksite 10, a Global Navigation Satellite System (GNSS) or other tracking device or system 28 may communicate with an onboard locating device 30 to monitor the movements of machine 12 and other known objects at worksite 10.

In one embodiment, sensory devices 24 may be divided into at least two categories, including sensory devices 24*a* that fall into a machine performance category and sensory devices 24*b* from an environment imaging category. Sensory devices 24*a* may be configured to sense any number and type of machine performance parameters. These performance parameters may include, for example, a speed of traction devices 22 or an engine of machine 12, a heading, an acceleration, a temperature, a pressure, a voltage level, a vibration, a payload, a fuel consumption or efficiency, and/or any other appropriate parameter that is indicative of a performance of machine 10. Based on signals from sensory devices 24*a*, characteristics of machine performance may be determined. Sensory devices 24*b* may be configured to generate images of the environment of worksite 10. For example, sensory devices 24*b* may be configured to detect and range objects in the area surrounding machine 12, detect or recognize pathways or conditions of the pathways at worksite 10, or capture still pictures and/or video of the area surrounding machine. Specifically, sensory devices 24*b* may include devices such as cameras, LIDAR sensors, RADAR sensors, etc. Based on signals from sensory devices 24*b*, characteristics of the environment at worksite 10 may be determined.

In the disclosed embodiment, at least some of sensory devices 24*b* may be cameras. In the disclosed embodiment, each camera may be able to generate a view associated with a particular zone of the area surrounding machine 12. It is contemplated that one or more of the cameras could be configured to move and generate views associated with more than one zone or views of the same zone from different angles, if desired. Signals from sensory devices 24 may be communicated to an onboard controller 32 for subsequent conditioning.

In some embodiments, the data captured by sensory devices 24 may be catalogued or indexed based on different criteria. For example, the data could be catalogued according to a time at which the data was captured (i.e., the data could be time-stamped). In another example, the data could be catalogued according to a location at which the data was captured. That is, information from locating device could be cross-referenced with information from locating device 30 (i.e., the data could be location-stamped). In addition, data (e.g., images and/or video) from sensory devices 24*b* could be cross-referenced to simultaneously captured values of the different performance parameters obtained via sensory devices 24*a*. Finally the data from all sensory devices 24 may include an indication as to the source identity of machine 12 from which the data was captured.

The data captured by sensory devices 24 may be continuously captured and recorded within a temporary memory module 32*a* of onboard controller 32. Memory module 32*a* may have a finite capacity to record data, and be configured to restart data recordation in the same memory locations after the capacity has been exhausted. For example, memory module 32*a* may be configured to record data for a twenty-four hour period, for several days, for a week, or for several weeks at a time. And after that time period has elapsed, controller 32 may begin recording over previously recorded information. It is contemplated that memory module 32*a* may be removable from controller 32, if desired, and selectively replaced with a different memory module 32*a* such that data is not overwritten.

Controller 32 may embody a single microprocessor or multiple microprocessors that include a means for monitoring, processing, recording, indexing, and/or communicating the data collected by sensory devices 24, and for displaying information regarding characteristics of machine 12 and the environment within an operator station 26. For example, controller 32 may include a storage device, a clock, and a processor, such as a central processing unit or any other means for accomplishing a task consistent with the present disclosure. Numerous commercially available microprocessors can be configured to perform the functions of controller 32. It should be appreciated that controller 32 could readily embody a general machine controller capable of controlling numerous other machine functions. Various other known circuits may be associated with controller 32, including signal-conditioning circuitry, communication circuitry, and other appropriate circuitry.

In some embodiments, controller 32 may also be configured to facilitate autonomous and/or enhance manual control of machine 12. In particular, controller 32, based on information from locating device 30 and instructions from an offboard worksite controller (OWC) 36, may be configured to help regulate movements and/or operations of its associated machine 12 (e.g., direct movement of associated traction devices 22, brakes, work tools, and/or actuators; and operations of associated engines and/or transmissions). Controller 32 may be configured to autonomously control these movements and operations or, alternatively, provide instructions to a human operator of machine 12 regarding recommended control. Controller 32 may also be configured to send operational information associated with machine components and data captured via sensory devices 24 offboard to OWC 36.

Communication between controller 32 and OWC 36 may be facilitated via a communicating device 38 located onboard each machine 12 (e.g., within operator station 26). This communication may include, for example, the coordinates of machine 12 generated by locating device 30, values of the performance parameters generated by sensory devices 24*a*, images of worksite 10 generated by sensory devices 24*b*, control instructions, and other information known in the art.

OWC 36, together with each controller 32 of machines 12, may embody a worksite data management system ("management system") 40. Data messages associated with management system 40 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communicating device 38 to exchange information between OWC 36 and controller 32.

OWC 36 may include any means for monitoring, recording, storing, indexing, processing, and/or communicating various operational aspects of worksite 10 and machines 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 3:
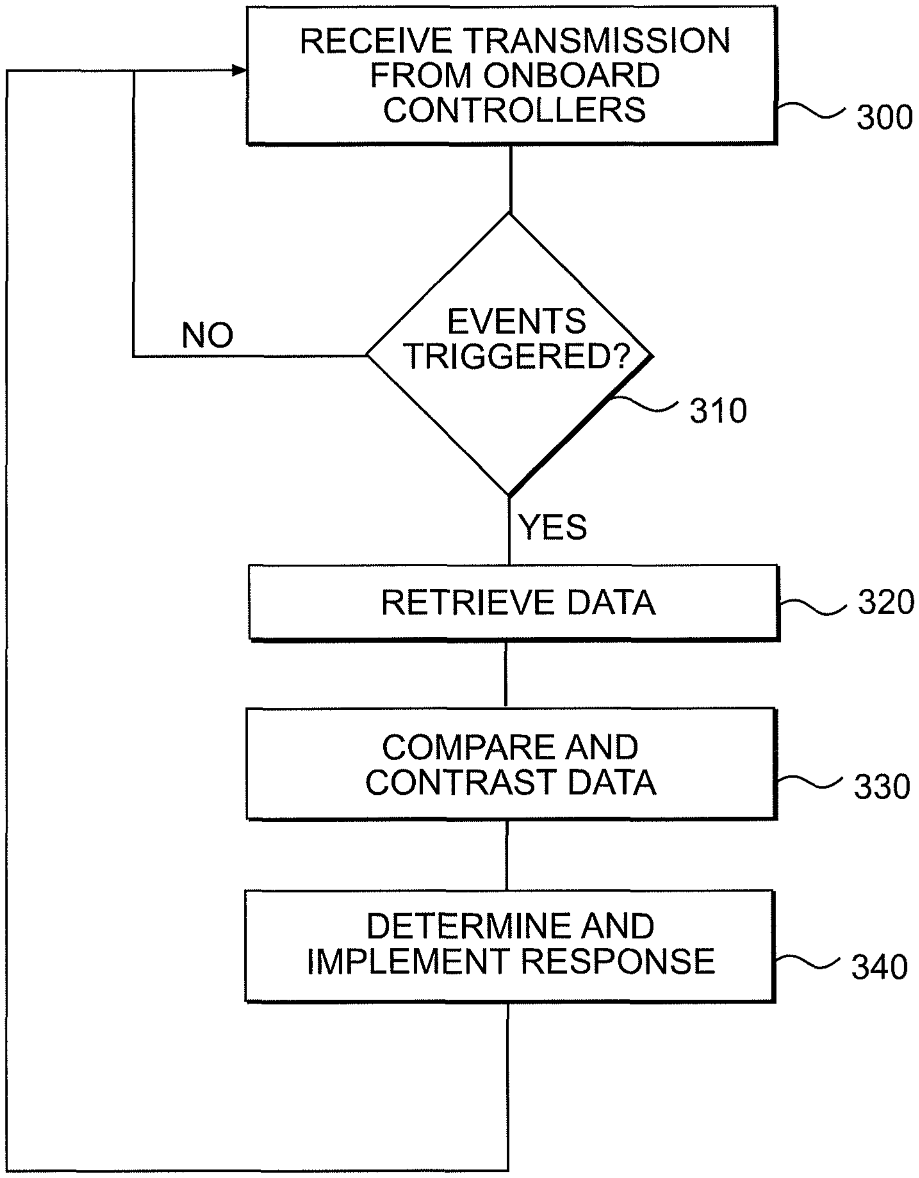
FIG. 3 is a flowchart depicting an exemplary disclosed process that may be implemented by the management system of FIG. 2.

Management system 40 may be configured to execute instructions stored on computer readable medium to perform methods of data management and machine control at worksite 10. FIG. 3 illustrates one example of these methods. FIG. 3 will be described in more detail below to further illustrate the disclosed concepts.

INDUSTRIAL APPLICABILITY

The disclosed data management system finds potential application at any worksite having multiple simultaneously operating machines. The disclosed system finds particular application at worksites having autonomously or semi-autonomously controlled machines. The disclosed system may be configured to obtain data captured onboard the machines, correlate the data, and use the data to address different events triggered at the worksite. Operation of management system 40 will now be described in detail with reference to FIG. 3.

As shown in FIG. 3, operation of management system 40 may begin with receipt of data transmissions from onboard controllers 32 (Step 300). Onboard controllers 32 may continuously receive signals from sensory devices 24 indicative of machine performance and environmental characteristics, and continuously record the data within memory module 32*a*. Onboard controllers 32 may then transmit the data to OWC 36 in any number of different ways. For example, controllers 32 may continuously transmit the data, transmit the data based on a predetermined schedule (i.e., periodically), transmit the data only upon triggering of an event, and/or transmit the data only when specifically requested to do so by OWC 36. OWC 36, in one embodiment, may store the data from all machines 12 within a common database that is indexed according to time, date, location, machine, and/or triggering event.

As described above, an event may be associated with an unexpected value for a monitored machine performance parameter (e.g., a malfunction) or a unexpected condition at worksite 10 (e.g., an obstacle in travel path 18 or a deteriorated travel path surface). In one embodiment, each controller 32 may be configured to independently trigger an event based on signals from sensory devices 24 mounted to the associated machine and based on expected values for the signals. In this embodiment, after event triggering, the corresponding controller 32 may transmit signals to OWC 36 associated with the event. These signals may include, for example, an indication of which of a list of possible events have been triggered, a location at worksite 10 of the triggering, a time of the triggering, an identification of the triggering machine 12, and the data from sensory devices 24 captured at about the time of triggering (e.g., just before, during, and/or just after triggering). In another embodiment, OWC 36 may be configured to trigger the event itself, based on the data transmitted from one or more of controllers 32. In other embodiments, both controllers 32 and OWC 36 may be configured to trigger events, and the events may be the same or different types of events.

Based on the transmission from controllers 32, OWC 36 may determine if any events have been triggered (e.g., by controllers 32 and/or by OWC 36 itself) (Step 310). When no events have been triggered, control may return to step 300.

When, however, an event has been triggered, OWC 36 may be configured to retrieve additional data associated with the event (Step 320). This data may be retrieved in any number of different ways and from any number of different sources.

In one embodiment, based upon triggering of a particular event, OWC 36 may be configured to request additional data from the controller 32 that captured data used to trigger the event. For example, OWC 36 may request data captured by one or more sensory devices 24 associated with the particular controller 32 from a time before, during, and/or after the event. Similarly, OWC 36 may request data captured by the same sensory devices 24 from a location adjacent to the event location (i.e., from a location ahead of or behind the event location along travel path 18). Additionally or alternatively, OWC 36 may request data captured by the same sensory devices 24 at another time and/or location not related to the event.

For example, a particular haul machine 12*b* may follow travel path 18 to an assigned dump target at dump location 16. During this travel, this haul machine 12*b* may capture, through use of sensory device 24*b*, video of travel path 18. At this same time, data from other sensors may also be captured, if desired. This data may include radar data associated with an area immediately in front of haul machine 12*b*. Based on the radar data, onboard controller 32 may detect an unexpected obstacle within travel path 18 that could cause damage to haul machine 12*b* or another machine at worksite 10. Accordingly, onboard controller 32 may trigger an unexpected obstacle event. Onboard controller 32 may continuously send the video data to OWC 36 as it is captured, and then send information relating to the unexpected obstacle event trigger when it is generated. Or, controller 32 may only send the video data and/or the trigger data once the trigger data is generated.

In another embodiment, OWC 36 may be configured to request data from a controller 32 of another machine 12 not associated with the event that has been triggered. For example, OWC 36 may be configured to request data captured by sensory devices 24 associated with a machine 12 having traveled through the event location at another time of the same or a different day. Similarly, OWC 36 may request data captured by sensory devices 24 associated with a machine 12 traveling immediately ahead of or behind the event-triggering machine 12 at the time of event triggering. Additionally or alternatively, OWC 36 may request data captured by sensory devices 24 associated with a machine 12 traveling at a completely different location and/or at a completely different time than the machine 12 that triggered the event.

In yet another embodiment, OWC 36 may be configured to instruct controller 32 of a particular machine 12 to obtain specific data associated with the already-triggered event. For example, OWC 36 may dispatch a particular machine 12 to travel through an area of worksite 10 that is the same as or similar to the event area and obtain additional data from any one or more of sensory devices 24. Dispatch instructions may include a particular travel path to take, a particular heading, a particular travel speed, etc. The data may include images of the event area from different angles, images of higher or lower resolution, images of different types, etc. The particular machine 12 dispatched to obtain the additional data may be the same type of machine 12 that triggered the event or a different type of machine 12, as desired.

In another embodiment, the additional data obtained by OWC 36 may have already been gathered within an offboard data base (not shown). In this situation, OWC 36 may simply be configured to retrieve the data from the database. This data may have been previously collected from any machine 12, at any time, and/or from any location at worksite 10. In one embodiment, the data retrieved by OWC 36 may be associated with previously-triggered events having similar characteristics to a current event just triggered.

After obtaining the original data used to trigger the event and the additional data from the same or other machines 12 operating at the same time, a different time, a same location, and/or a different location, OWC 36 may compare and contrast the data (Step 330). Any type of analysis, algorithm, or strategy may be employed to compare and contrast the data. For example, images of a particular portion of travel path 18 captured at different times may be compared to determine how that location may have changed over time. Additionally or alternatively, images captured from different machines 12 of the same location and/or from different angles may be compared to better determine characteristics of the event (e.g., magnitude or scope). Further, images captured from different locations of worksite 10 by the same or different machines 12 may be compared to determine if sensory devices 24 are functioning properly. Other similar comparisons may be instituted.

Returning to the example provided above, after receiving the video of travel path 18 and data associated with the unexpected obstacle that triggered the event, OWC 36 may search through the associated database to determine if any other machines 12 that passed through the same area also triggered similar events. OWC 36 may then obtain the trigger data and the associated video data from those machines 12, and compare and contrast the data. Additionally or alternatively, OWC 36 may obtain data from other machines 12 having previously passed through the same area (or a different area at about the same time) that did not trigger an event, and then compare and contrast the data.

After comparison of the data has been completed, OWC 36 may then determine and implement an appropriate event response (Step 340). The response may be determined or selected from a list of available responses based on the comparison to either correct conditions that triggered the event or to allow operations at worksite 10 to continue in spite of the event-triggering conditions. For example, OWC 36 may alter the assigned tasks of particular machines 12, causing the machines 12 to directly address the conditions. In one situation, this may involve dispatching a road repair or other type of cleanup machine 12*c* to remove the detected obstacle within travel path 18, to repair travel path 18, and/or to create a detour or alternate path. In this situation, data obtained from the event-triggering machine may be provided to and/or displayed within the cleanup machine 12*c* to assist in completion of the response. In another situation, the response may involve autonomous control over machines 12 in a different manner, for example implementing evasive maneuvering (e.g., slowing, stopping, steering, accelerating, gear changing, load adjusting, trajectory planning, etc.). Other responses are also contemplated.

Because the disclosed system may coordinate fleet data from multiple machines 12 operating at worksite 10, decisions regarding event response may be more informed. By being better informed about the event and conditions surrounding triggering of the event, it may be more likely that the response generated to address the event is effective and efficient.

It will be apparent to those skilled in the art that various modifications and variations can be made to the data management system of the present disclosure. Other embodiments will be apparent to those skilled in the art from consideration of the specification and practice of the data management system disclosed herein. For example, it is contemplated that onboard controllers 32 may be periodically physically removed from their associated host machines 12, and the data locally transferred to OWC 36 instead of being wirelessly transmitted, if desired. It is intended that the specification and examples be considered as exemplary only, with a true scope being indicated by the following claims and their equivalents.

What is claimed is:

1. A data management system for use with a plurality of machines operating at a common worksite, the data management system comprising:

a plurality of sensory devices, each located onboard a different one of the plurality of machines and configured to generate data regarding at least one of machine performance and worksite conditions, wherein the plurality of sensory devices are configured to capture the data continuously during operation of the plurality of machines;

a plurality of locating devices, each located onboard a different one of the plurality of machines and configured to generate a machine location signal;

a plurality of communication devices, each located onboard a different one of the plurality of machines;

a plurality of memory modules, each located onboard a different one of the plurality of machines, wherein the data is stored for a predetermined period of time within the plurality of memory modules; and a worksite controller configured to:

receive the data and the machine location signals from onboard the plurality of machines via the plurality of communication devices;

determine an event triggering based on the data received from onboard at least a first of the plurality of machines; and selectively retrieve data from at least a second of the plurality of machines based on the event triggering.

2. The data management system of claim 1, wherein the worksite controller is located offboard the plurality of machines.

3. The data management system of claim 1, wherein the data is time-stamped within the plurality of memory modules.

4. The data management system of claim 1, wherein the data is location-stamped within the plurality of memory modules based on the machine location signal.

5. The data management system of claim 1, wherein a machine identity associated with a source of the data is linked to the data within the plurality of memory modules.

6. The data management system of claim 1, wherein an environmental condition occurring at the same time as capture of the data is linked to the data within the plurality of memory modules.

7. The data management system of claim 1, wherein a machine operation associated with a source of the data is linked to the data within the plurality of memory modules.

8. The data management system of claim 1, wherein the at least a second of the plurality of machines includes at least one of a machine traveling in front of or a machine traveling behind the at least a first of the plurality of machines during capture of data used to trigger the event.

9. The data management system of claim 1, wherein:
the at least a second of the plurality of machines includes at least one machine having traveled through a same location from which the data used to trigger the event was captured; and
the data selectively retrieved from the at least a second of the plurality of machines was captured at a time different than a time of the event triggering.

10. The data management system of claim 1, wherein the data retrieved from the at least a first of the plurality of machines includes data of a same type as was used to trigger the event.

11. The data management system of claim 1, wherein:
the at least a second of the plurality of machines includes at least one machine having traveled through a different location from which the data used to trigger the event was captured at a time of the event triggering; and
the data selectively retrieved from the at least a second of the plurality of machines was captured at the time of the event triggering.

12. The data management system of claim 1, wherein the data selectively retrieved from the at least a second of the plurality of machines includes data captured by multiple sensory devices mounted on the at least a second of the plurality of machines.

13. The data management system of claim 1, wherein the worksite controller is further configured to dispatch the at least a second of the plurality of machines to a same location at which data was captured that was used to trigger the event.

14. The data management system of claim 13, wherein the worksite controller is further configured to instruct the at least a second of the plurality of machines dispatched to the same location to capture additional data from the same location.

15. The data management system of claim 14, wherein the worksite controller is further configured to instruct the at least a second of the plurality of machines to capture the additional data from the same location during travel of the at least a second of the plurality of machines in a manner different than travel of the at least a first of the plurality of machines during the event triggering.

16. The data management system of claim 15, wherein the travel includes at least one of a different heading and a different speed.

17. The data management system of claim 14, wherein the at least a second of the plurality of machines is a different type of machine than the at least a first of the plurality of machines.

18. The data management system of claim 17, wherein the worksite controller is further configured to:
make a comparison of the data received from the first of the plurality of machines with the data selectively retrieved from the second of the plurality of machines; and
determine a response to the event based on the comparison.

19. The data management system of claim 18, wherein the response includes dispatching a cleanup machine to a location of the event.

20. The data management system of claim 19, wherein the worksite controller is further configured to transmit the data selectively retrieved from the at least a second of the plurality of machines to the cleanup machine dispatched by the worksite controller.

21. The data management system of claim 1, wherein:
the plurality of sensory devices includes a camera; and
the data selectively retrieved from the at least a second of the plurality of machines includes at least one of still pictures and video of an environment of the at least a second of the plurality of machines.

22. The data management system of claim 1, wherein the plurality of sensory devices includes:
a first type of sensory devices used to trigger events; and
a second type of sensory devices used to capture data selectively retrieved from the at least a second of the plurality of machines.

23. The data management system of claim 22, wherein:
the first type of sensory device is a machine performance sensor; and
the second type of sensory device is a camera configured to capture at least one of still pictures and video of an environment at the worksite.

24. The data management system of claim 1, wherein the event includes at least one of a detected obstacle, a roadway condition, and a machine malfunction.

25. The data management system of claim 1, wherein the worksite controller is further configured to transmit instructions indicative of evasive actions that should be taken by the plurality of machines based on the data selectively retrieved from the at least a second of the plurality of machines.

26. A data management system for use with a plurality of machines operating at a common worksite, the data management system comprising:
a plurality of imaging devices, each located onboard a different one of the plurality of machines and configured to continuously generate image data of the worksite;
a plurality of locating devices, each located onboard a different one of the plurality of machines and configured to generate a machine location signal;
a plurality of communication devices, each located onboard a different one of the plurality of machines;
a plurality of memory modules, each located onboard a different one of the plurality of machines, wherein the image data is stored for a predetermined period of time within the plurality of memory modules; and
an offboard worksite controller configured to:
receive the image data and the machine location signals from onboard the plurality of machines via the plurality of communication devices;
determine an event triggering associated with operation of a first of the plurality of machines at a first location of the worksite;
retrieve image data from the first of the plurality of machines captured at a time of the event triggering; and
selectively retrieve from an offboard data base image data previously captured from at least a second of the plurality of machines associated with the first location.

27. A method of worksite data management, comprising:
capturing data from onboard a plurality of machines regarding at least one of machine performance and worksite conditions;
determining a location of each of the plurality of machines;
selectively triggering an event based on the data captured from onboard at least a first of the plurality of machines;
storing the data for a predetermined period of time in a plurality of memory modules, each located onboard a different one of the plurality of machines; and
selectively retrieving data from at least a second of the plurality of machines based on the event triggering.

28. The method of claim 27, wherein capturing data includes continuously capturing the data during operation of the plurality of machines.

29. The method of claim 27, wherein the at least a second of the plurality of machines includes at least one of a machine traveling in front of or a machine traveling behind the at least a first of the plurality of machines during capturing of data used to trigger the event.

30. The method of claim 27, wherein:

the at least a second of the plurality of machines includes at least one machine having traveled through a same location from which the data used to trigger the event was captured; and the data selectively retrieved from the at least a second of the plurality of machines was captured at a time different than a time of the event triggering.

31. The method of claim 27, wherein:

the at least a second of the plurality of machines includes at least one machine having traveled through a different location from which the data used to trigger the event was captured at a time of the event triggering; and the data selectively retrieved from the at least a second of the plurality of machines was captured at the time of the event triggering.

32. The method of claim 27, wherein selectively retrieving data includes dispatching the at least a second of the plurality of machines to a same location at which data was captured that was used to trigger the event.

33. The method of claim 32, further including instructing the at least a second of the plurality of machines dispatched to the same location to capture additional data from the same location.

34. The method of claim 33, wherein instructing the at least a second of the plurality of machines includes instructing the at least a second of the plurality of machines to capture the additional data from the same location during travel of the at least a second of the plurality of machines in a manner different than travel of the at least a first of the plurality of machines during the event triggering.

35. The method of claim 34, wherein the travel includes at least one of a different heading and a different speed.

36. The method of claim 34, wherein the at least one of the plurality of machines is a different type of machine than the at least a first of the plurality of machines.

37. The method of claim 27, wherein the data includes at least one of still pictures and video of a worksite environment.

38. The method of claim 27, wherein the event includes at least one of a detected obstacle, a roadway condition, and a machine malfunction.

39. The method of claim 27, further including transmitting instructions indicative of evasive actions that should be taken by the plurality of machines based on the data selectively retrieved from the at least a second of the plurality of machines.

40. The method of claim 27, wherein selectively retrieving data from at least a second of the plurality of machines includes locally retrieving the data from a control module previously removed from a host machine.

* * * * *